(12) United States Patent
Marini

(10) Patent No.: US 9,663,230 B2
(45) Date of Patent: *May 30, 2017

(54) REMOVABLE BACK SHELL FOR AN AIRCRAFT SEAT

(71) Applicant: PAC Seating Systems, Inc., Palm City, FL (US)

(72) Inventor: Hector Noel Marini, Palm City, FL (US)

(73) Assignee: PAC SEATING SYSTEMS, INC., Palm City, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/068,149

(22) Filed: Mar. 11, 2016

(65) Prior Publication Data

US 2017/0008631 A1    Jan. 12, 2017

Related U.S. Application Data

(63) Continuation of application No. 14/623,750, filed on Feb. 17, 2015, now abandoned, which is a continuation of application No. 13/967,725, filed on Aug. 15, 2013, now abandoned, which is a continuation of application No. 13/758,633, filed on Feb. 4, 2013, now Pat. No. 8,517,311, which is a continuation of application No. 12/577,120, filed on Oct. 9, 2009, now Pat. No. 8,366,044.

(51) Int. Cl.

| *B64D 11/06* | (2006.01) |
|---|---|
| *B60N 2/24* | (2006.01) |
| *B60N 2/70* | (2006.01) |
| *B60N 2/68* | (2006.01) |

(52) U.S. Cl.
CPC .......... *B64D 11/0647* (2014.12); *B60N 2/24* (2013.01); *B60N 2/68* (2013.01); *B60N 2/7011* (2013.01); *B64D 11/06* (2013.01); *B64D 11/064* (2014.12); *B64D 11/0649* (2014.12); *Y02T 50/46* (2013.01)

(58) Field of Classification Search
USPC ...... 244/122 R; 297/452.12, 452.13, 452.18, 297/452.11, 452.14, 452.16
See application file for complete search history.

(56) References Cited

U.S. PATENT DOCUMENTS

| 2,281,902 A | 5/1942 | Witz |
| 3,336,078 A | 8/1967 | Haley |
| 3,519,308 A | 7/1970 | Kasman et al. |
| 4,285,544 A | 8/1981 | Zapf |
| 4,488,755 A | 12/1984 | Nemschoff |
| 4,781,417 A | 11/1988 | Shipman et al. |
| 4,844,541 A | 7/1989 | Laird |

(Continued)

OTHER PUBLICATIONS

Opinion and Order Denying Defendant's Motion for Partial Summary Judgment—Jan. 22, 2010, *Giasson Aerospace* v. *RCO Engineering*—(EDMI 08-13667), p. 6, paragraph 9.

*Primary Examiner* — Christopher P Ellis
(74) *Attorney, Agent, or Firm* — Troutman Sanders LLP

(57) ABSTRACT

An aircraft seat that includes a seat bottom frame having a back, a seat back frame pivotally connected to the back of the seat bottom frame, and a seat back shell. The seat back shell has at least a front panel, a back panel opposite the front panel, and at least two side panels disposed between the front and back panels which connects the front panel to the back panel. The combination of the front, back, and side panels form a gap to receive the entire seat back frame.

11 Claims, 11 Drawing Sheets

(56) References Cited

U.S. PATENT DOCUMENTS

| | | |
|---|---|---|
| 5,895,096 A | 4/1999 | Massara |
| 6,250,718 B1 | 6/2001 | Newhouse et al. |
| 6,811,227 B2 | 11/2004 | Andersson et al. |
| 7,377,589 B1 | 5/2008 | Glater |
| 7,604,298 B2 | 10/2009 | Peterson et al. |
| 8,251,454 B2 | 8/2012 | Tsukiji et al. |
| 2008/0290715 A1 | 11/2008 | Fullerton et al. |

FIG. 8C
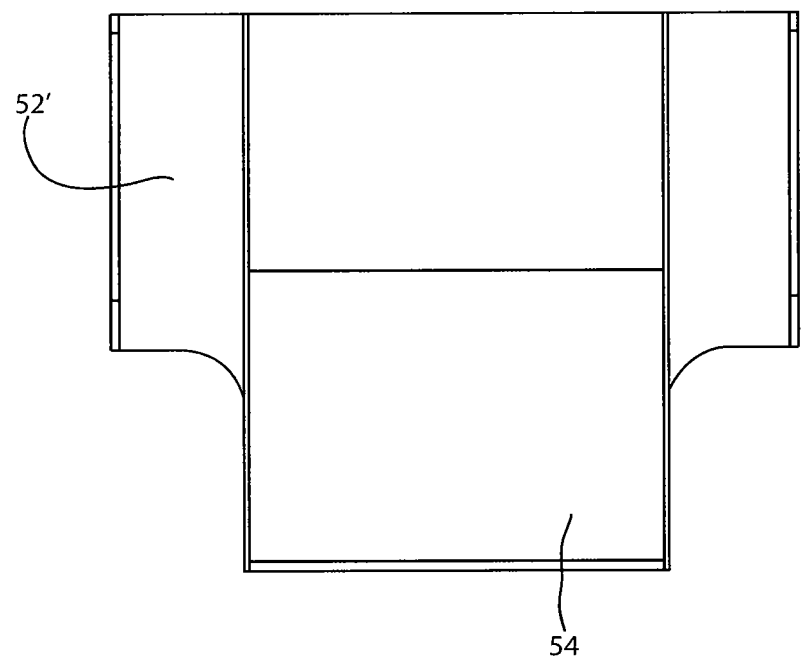
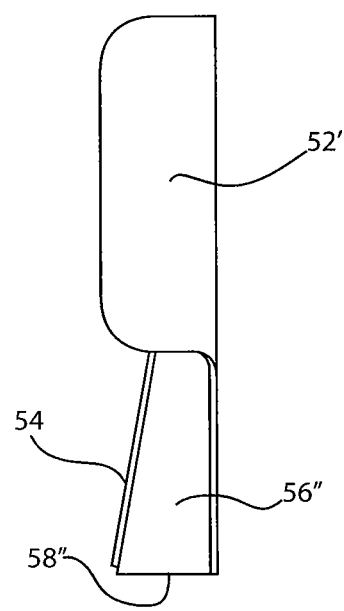
FIG. 8D

REMOVABLE BACK SHELL FOR AN AIRCRAFT SEAT

CROSS-REFERENCE TO RELATED APPLICATIONS

The present application is a Continuation of U.S. application Ser. No. 14/623,750 filed on Feb. 17, 2015, which is a Continuation of U.S. application Ser. No. 13/967,725 filed on Aug. 15, 2013, which is a Continuation of U.S. application Ser. No. 13/758,633 filed on Feb. 4, 2013, now U.S. Pat. No. 8,517,311 issued Aug. 27, 2013, which is a Continuation of U.S. application Ser. No. 12/577,120 filed on Oct. 9, 2009, now U.S. Pat. No. 8,366,044 issued Feb. 5, 2013, all of which are hereby incorporated by reference in their entireties.

FIELD OF THE INVENTION

The invention relates to aircraft seat construction and upholstery, and more particularly unique shells that can be assembled and upholstered separate from the aircraft seat.

BACKGROUND OF THE INVENTION

Aircraft seats are typically upholstered on the structure. The process begins by a seat manufacturer building the seat components and superstructure first then sending the seat to the upholster to be padded and covered with material. This means that an upholsterer must wait until the structure is completed in order to start the process. This delays the upholster and typically either causes a rush in production by the upholster or a delay in the delivery schedule.

Aircraft seat upholsters are tasked with more than just placing fabric over the seat structure. They are typically only given the seat in a basic form and must build up the seat structure with dense foam or heavier materials required to accommodate different seat styling. Further, the replacement of backrest upholstery is very time consuming since either the entire seat or backrest structure of the seat must be removed and shipped to the upholster, or the upholster must come to the aircraft. This is even further complicated for the replacement of components inside of the backrest. This is again a very time consuming process wherein typically the seat components are repaired in one facility and upholstered in another.

The present invention solves this problem by using a standard shaped shell that fits over the backrest structure and can be upholstered separate from the seat structure itself.

SUMMARY OF THE INVENTION

The invention is directed to an aircraft seat that includes a seat bottom frame having a back, a seat back frame pivotally connected to the back of the seat bottom frame, and a seat back shell. The seat back shell has at least a front panel, a back panel opposite the front panel, and at least two side panels disposed between the front and back panels which connects the front panel to the back panel. The combination of the front, back, and side panels form a gap to receive the entire seat back frame. Further, the seat back shell can, at a minimum only have the front panel, the back panel, and two side panels.

In another series of embodiments, the gap, or hollow portion, is sized to fit the whole seat back. This is opposed to single members of the seat back frame inserted into single gaps sized to receive only a single member, and the seat back frame includes multiple members. Further, in an embodiment, the seat back shell only encloses the seat back frame. For any embodiment, a size of the front panel can be the same or different from the back panel. Also, at least a portion of the side panels are formed in a triangular or a trapezoidal shape In a typical embodiment, the seat back shell is upholstered separate from the aircraft seat. The seat back frame then includes a flange to engage a top of the seat back shell to retain the seat back shell on the seat back frame. The upholstered seat back shell is removably and replacably engaged to the seat back frame while the seat back frame remains connected to the seat bottom frame. This allows for the aircraft seat to be assembled at a location separate from the upholster and not dissembled by the upholster during the upholstering process. Additionally, the upholstery can be changed once the aircraft seat is in service without dissembling the seat frame.

BRIEF DESCRIPTION OF THE DRAWINGS

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein:

FIGS. 8A-8D illustrate a perspective, top, front, and side view, respectively, of a further seat back shell of the present invention.

DETAILED DESCRIPTION OF THE INVENTION

Figure 1:
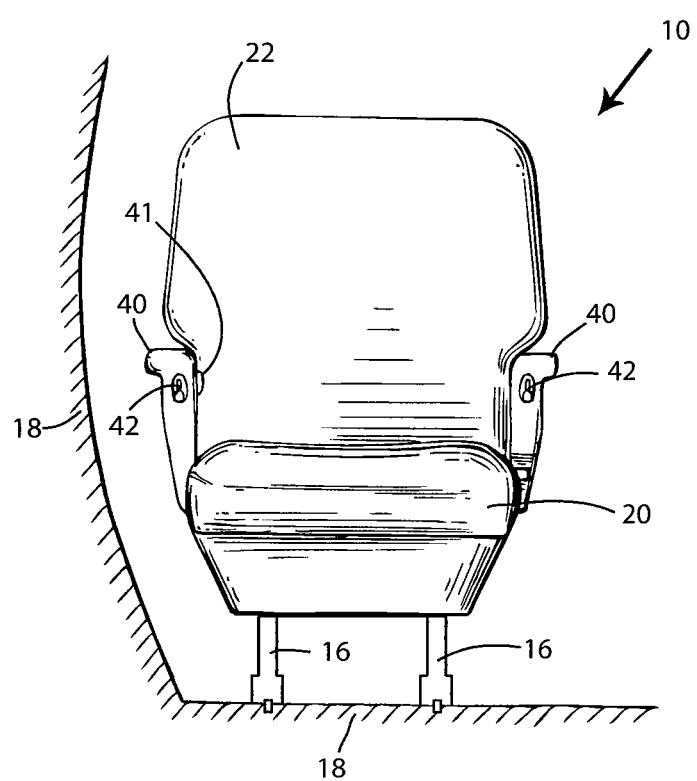
FIG. 1 is a front view of an upholstered aircraft seat of the present invention.
Figure 2:
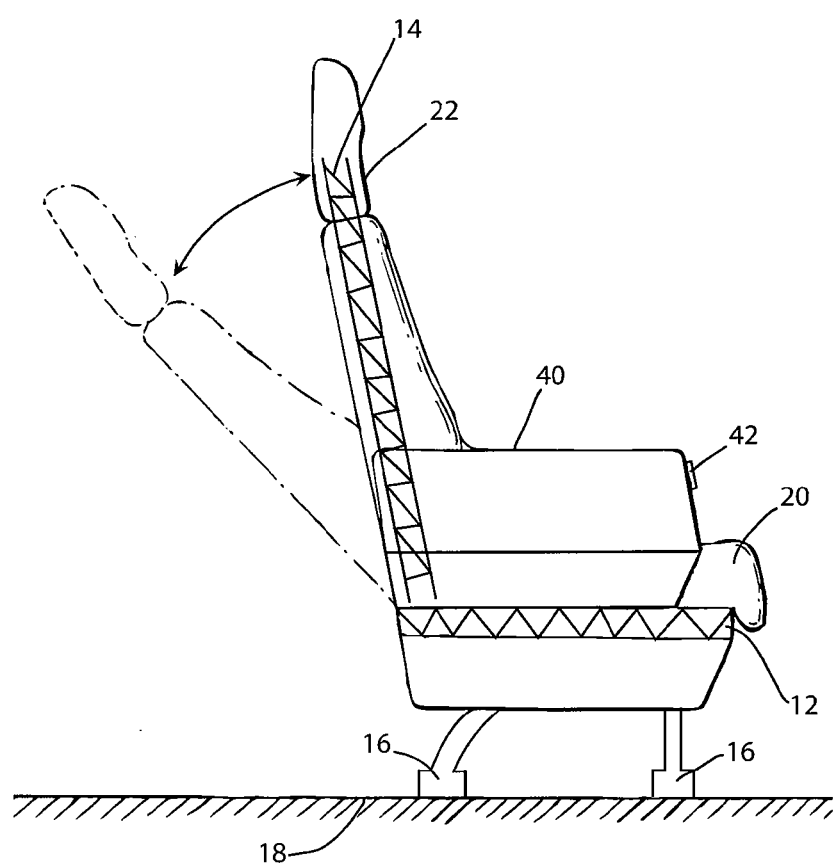
FIG. 2 is a partially cut-away left side view of an aircraft seat of the present invention.
Figure 3:
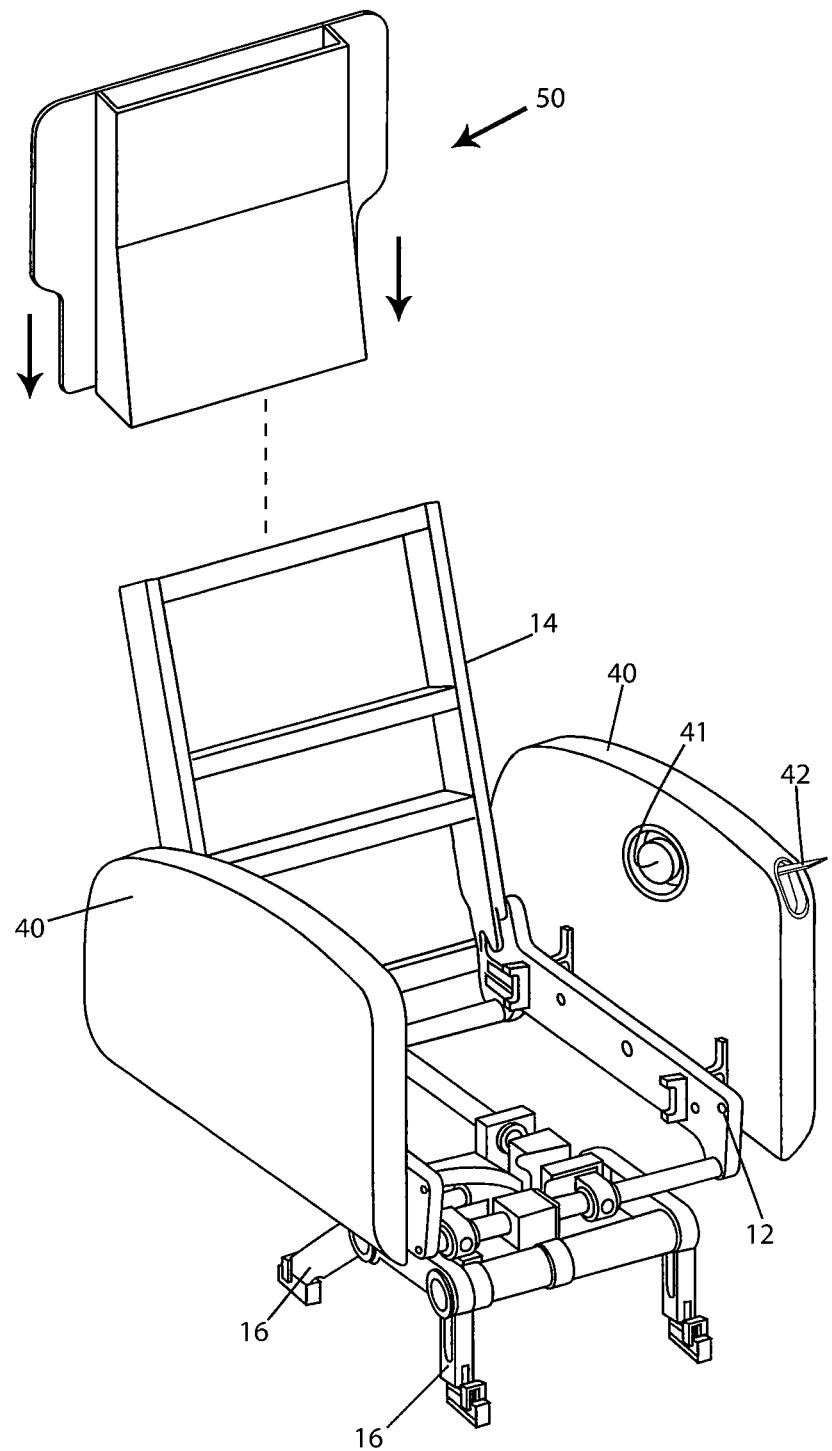
FIG. 3 is an non-upholstered top-front-left side perspective view of an aircraft seat with an embodiment of a shell of the present invention.

An embodiment of the invention will be described herein below with reference to FIGS. 1-3.

An aircraft seat 10 includes a seat bottom frame 12 and a seat back frame 14. The seat bottom frame 12 is attached, on a bottom side, to seat supports 16 which are fixed to the floor of an aircraft fuselage 18. The seat back frame 14 is pivotally attached to one end of the seat bottom frame 12. The seat bottom frame 12 and the seat back frame 14 have generally square and rectangular configurations, respectively, and can be made from aluminum, light gauge steel, alloys, a strong light-weight plastic, or composites. Seat base 20 is located over the top side of seat bottom frame 12 and is upholstered to be in contact with a passenger. The seat base 20 typically covers the seat bottom frame 12. The seat back frame 14 can pivot from an upright position, to a reclined position, and back again, as illustrated in FIG. 2.

The aircraft seat 10 is also provided with a pair of arm rests 40. Both arm rests are typically permanently fixed to the seat bottom frame 12. On a surface of either armrest 40 is a user operated seat control 42. Further, the armrest 40 can include a seat reclining control 41.

The seat back frame 14 is a series of members, which in and of itself cannot be upholstered without sufficient structure to support the padding and material. A seat back shell 50 is provided that provides shape and structure for the upholster to pad and apply material to form an upholstered seat back 22. As illustrated in FIG. 3, the seat back shell 50 can be upholstered and slid over the entirety of the seat back frame 14 to form the upholstered seat back 22. Further, if necessary, it can be removed to facilitate reupholstering or to gain access to the seat back frame 14 and any components therein without removing the entire seat back frame 14.

Figure 4:
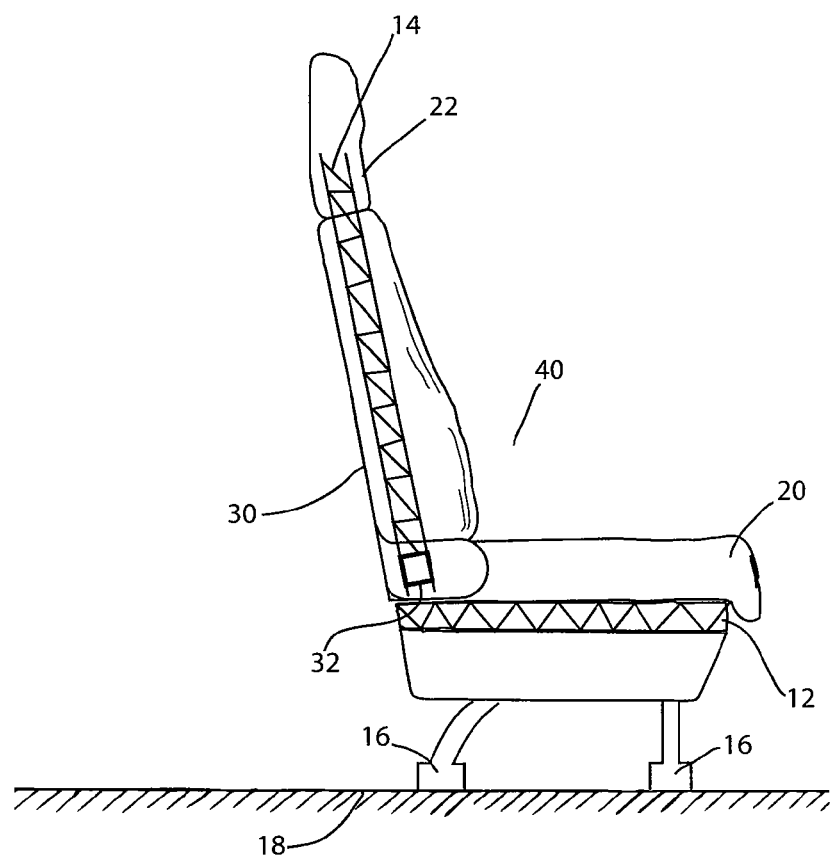
FIG. 4 is a partially cut-away left side view of an aircraft seat illustrating an embodiment of attaching the seat back shell to the seat back frame of the present invention.
Figure 5:
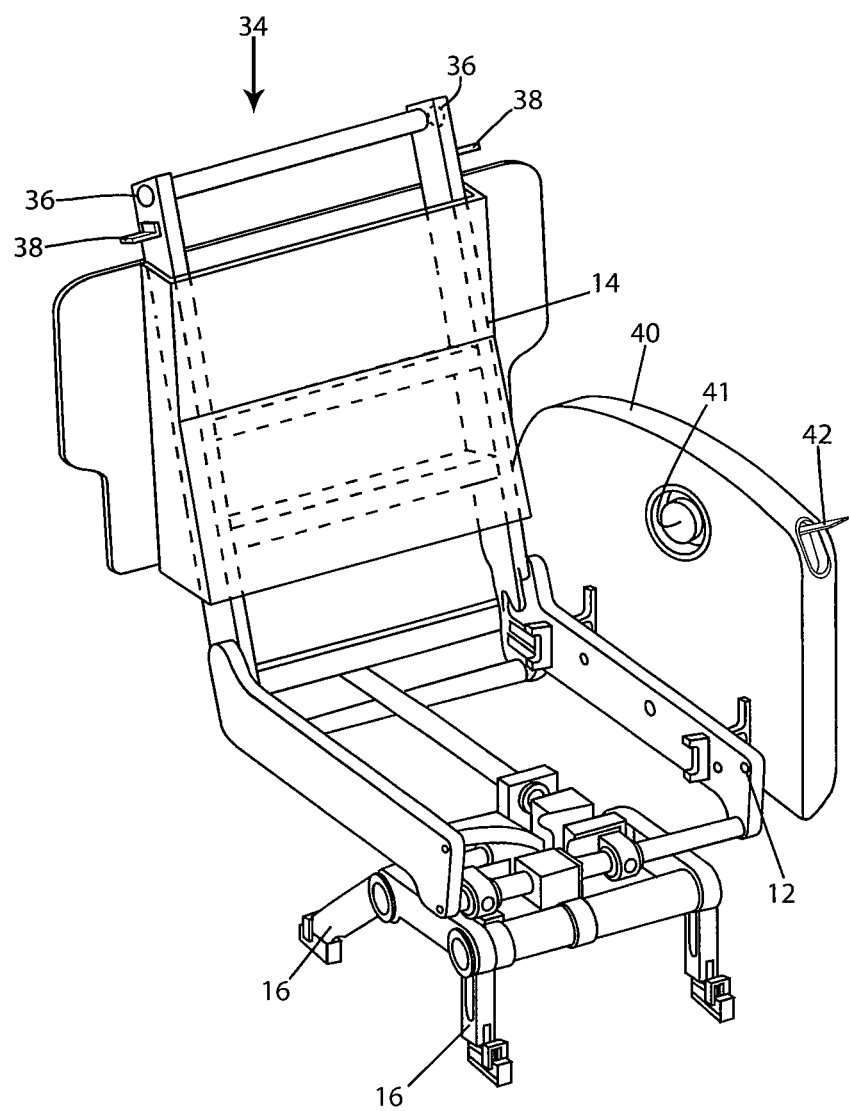
FIG. 5 is a top-front-left side perspective view of an aircraft seat illustrating another embodiment of attaching a seat back shell to the seat back frame of the present invention.

FIGS. 4 and 5 illustrate how the seat back shell 50 can be connected to the seat back frame 14 in a number of ways. In one embodiment, the seat back shell 50 is attached to the seat back frame 14 in a manner similar to the typical upholstering of aircraft seats. A covering material 30 wraps around a bottom cross member 32 of the seat back frame 14 and fastens to itself to close out the bottom of the upholstery. This keeps the shell from coming up and off the seat back frame 14. In this way, upholsters are not required to change their typical upholstery methods, allowing for easy adoption of the present invention.

In another embodiment, a top 34 of the seat back frame 14 has ferrules 36 for the headrest tubes that are screwed onto the frame. These have a flange 38 that in turn capture the seat back shell 50 and prevent it from moving up and off the seat back frame 14.

FIGS. 6A-6E illustrate an embodiment of the seat back shell 50. It includes the back panel 52 which gives form to the back shape of the seat. In this embodiment, the back panel 52 has a "T" shape. A front panel 54 is formed which can be relatively flat material that padding can be built up on or a padded structure generally formed to the seat requirements and can be directly covered in fabric or material. The front panel 54 gives form and shape to the front of the seat which contacts the user. The front panel 54 and the back panel 52 are connected via two or more side panels 56. While the front 52 and back 54 panels run approximately parallel to each other, the side panels 56 are formed approximately perpendicular to the front 52 and back 54 panels. The side panels 56 are spaced apart and oppose each other and connect the front panel 52 to the back panel 54. This forms a gap 58 between the front panel 54 and the back panel 52. The seat back shell 50 is then formed and shaped by the upholster, if necessary, and then covered in material. The material can be any fabric or animal hide or any other material known to those of ordinary skill to cover seats.

The spacing of the front, back and side panels 52, 54, 56 is such to form the gap 58 to receive the seat back frame 14 therein. The seat back frame 14 supports the upholstered seat back shell 50 to form the upholstered seat back 22. Once engaged on the seat back frame 14, additional upholstery can be added to cover any remaining portions of the seat bottom frame 12 or the seat back frame 14 that may still be exposed. The hollow cavity formed by the gap 58 remains primarily hollow and actually lowers the weight of the seat. Further, less padding is required during the upholstery process, leading to a cost savings.

The gap 58 is typically continuous from one side panel 56 to the other so as to receive the entire width of the seat back frame 14 without any interior subdivisions. This is typically the embodiment, since aircraft seats require cross struts and bracing to allow for increased structural integrity (as opposed to domestic furniture) to meet the safety requirements set forth by the Federal Aviation Administration (FAA) in the United States, and by similar agencies world wide. This also entails that the seat back shell 50 has enough structural integrity by the combination of the front, back and side panels 52, 54, 56, along with the upholstery process to stand without the structural support of the seat back frame 14.

Further, the gap 58 typically does not have a top or bottom panel. The lack of a bottom panel allows the entire seat back frame 14 to be received in the gap 58. The lack of a top panel allows for further weight reduction since the top of the gap 58 can be covered in padding and material instead of a solid panel. However, if a solid panel is included it is typically located at the top edge of the front, back and side panels 52, 54, 56, or offset into the gap 58.

Figure 6A:
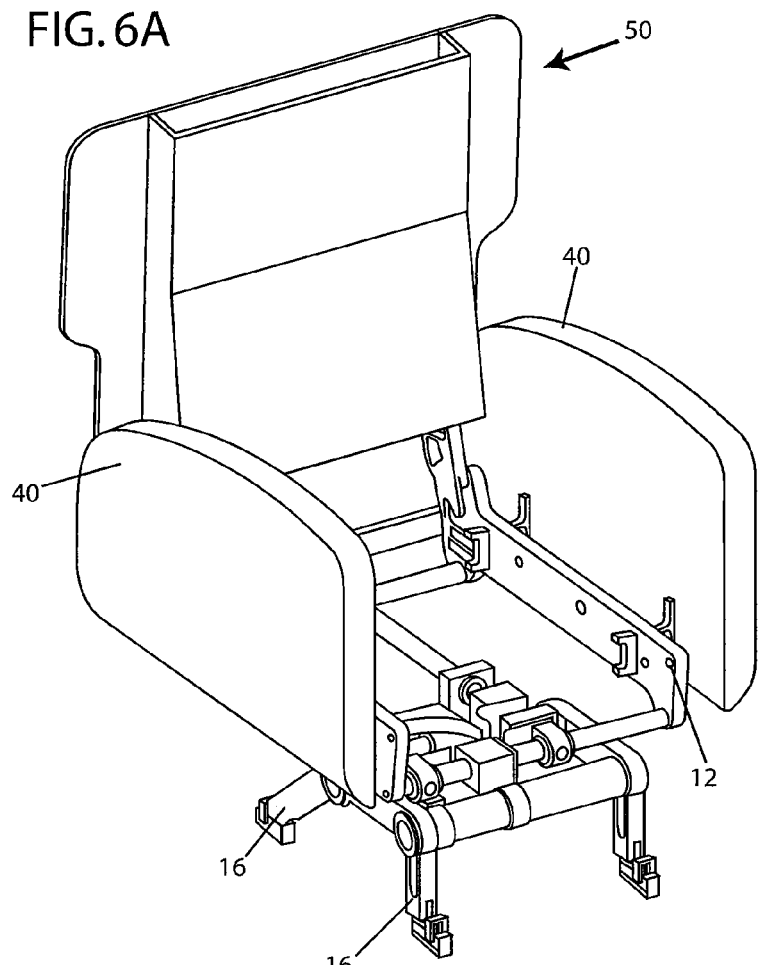
FIGS. 6A-6E illustrate a perspective, top, front, and side view, respectively, of a seat back shell of the present invention.
Figure 6B:
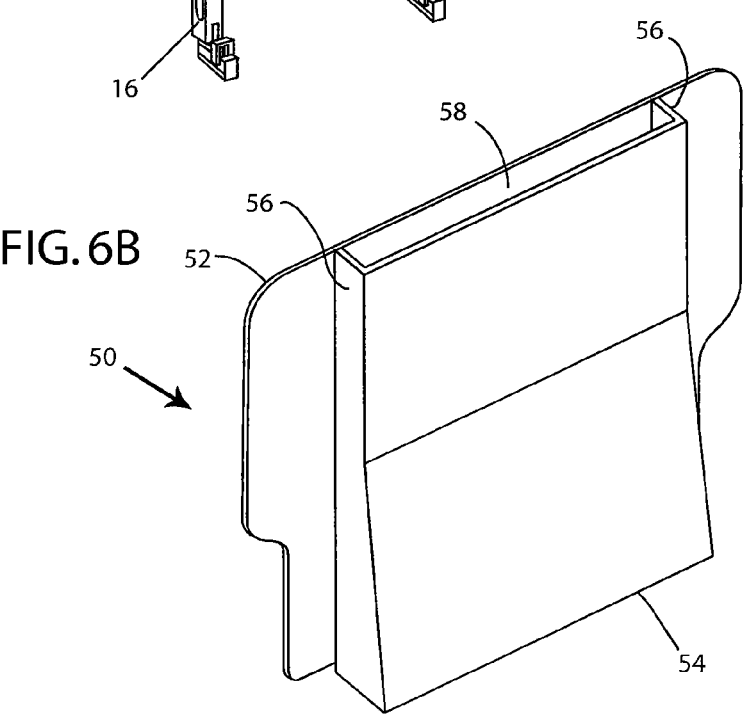
Figure 6C:
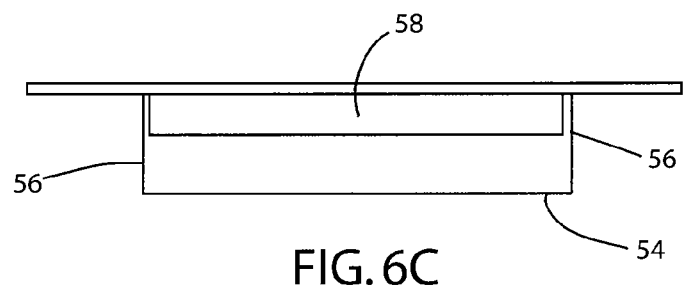
Figure 6D:
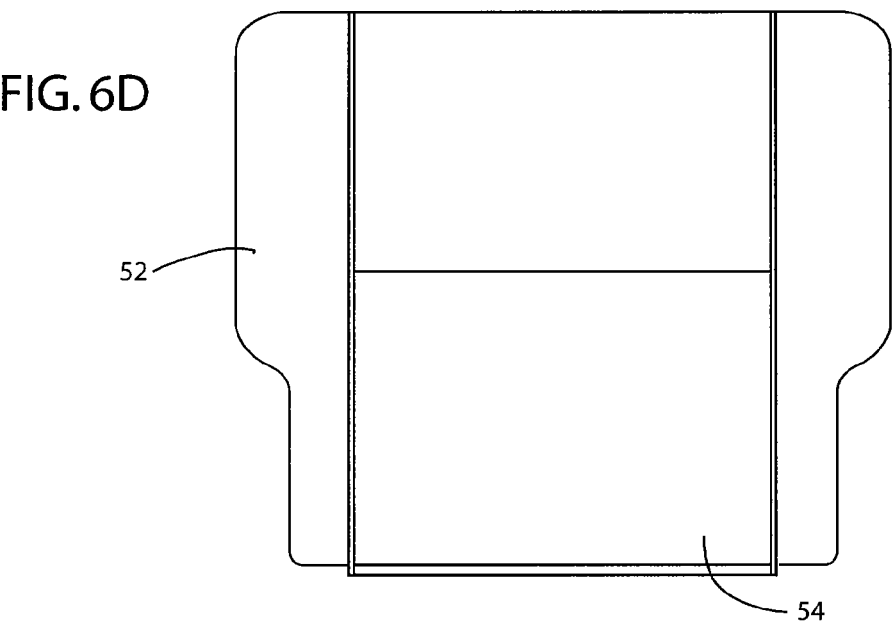
Figure 6E:
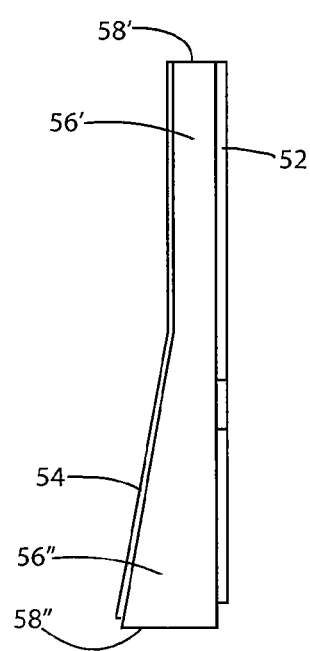
Figure 7A:
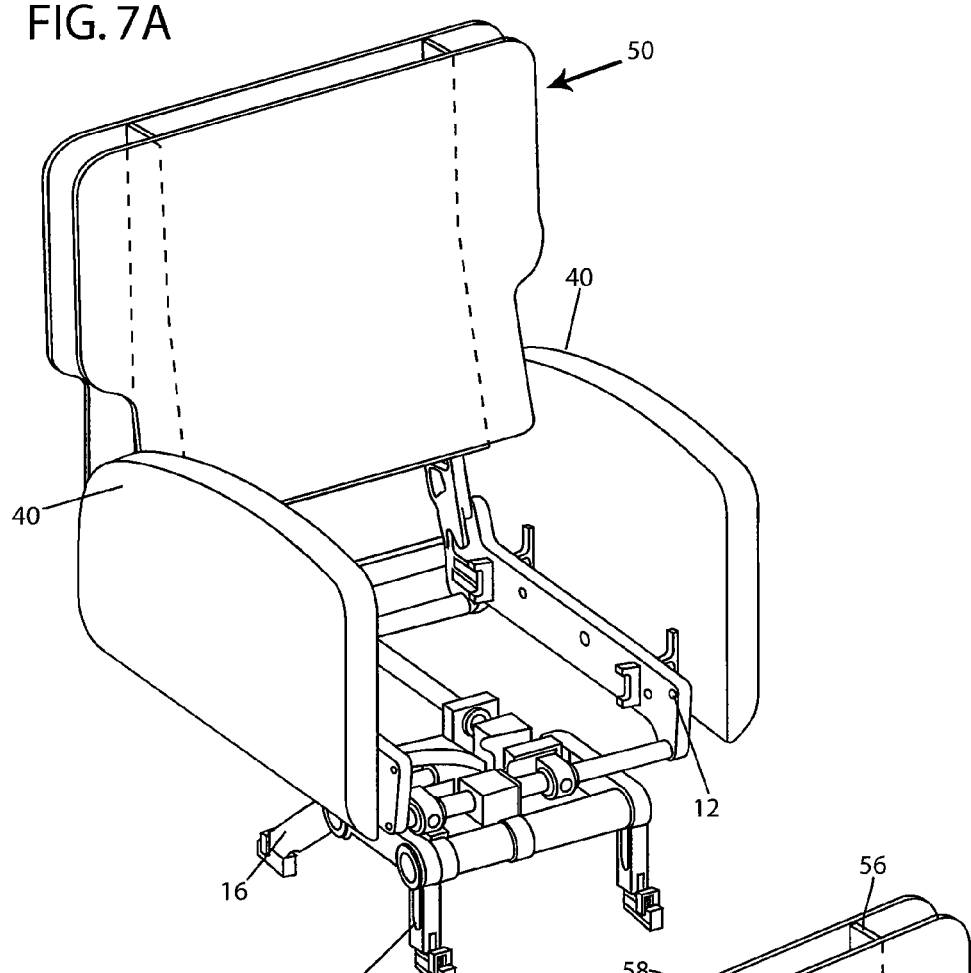
FIGS. 7A-7E illustrate a perspective, top, front, and side view, respectively, of another embodiment of a seat back shell of the present invention.
Figure 7B:
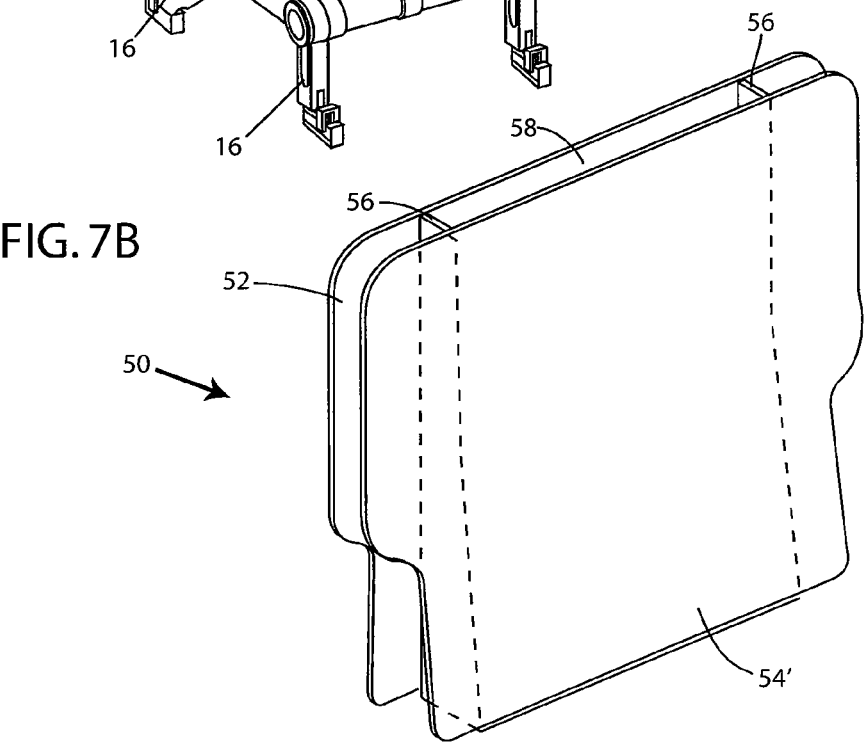
Figure 7C:
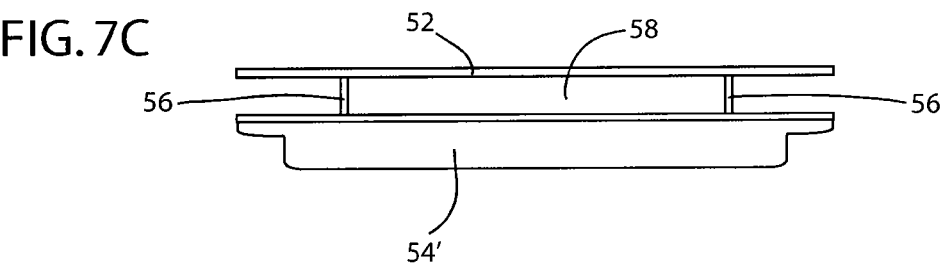
Figure 7D:
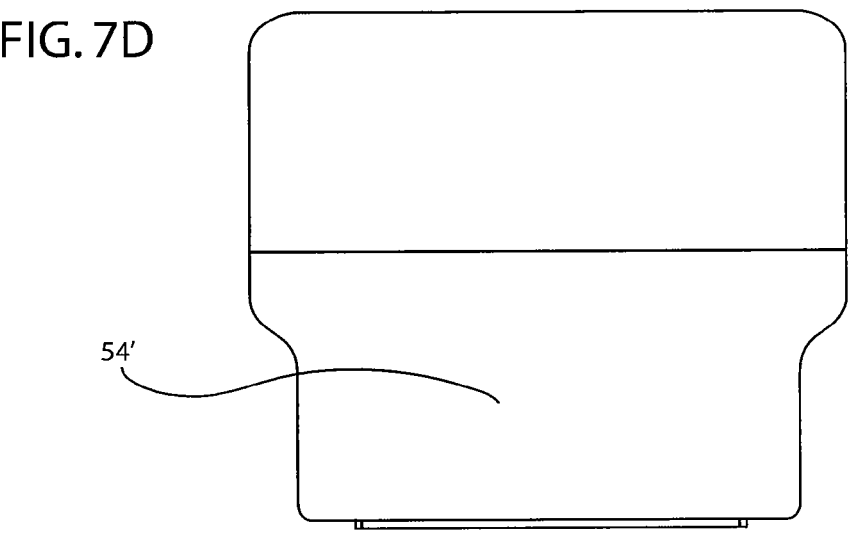
Figure 7E:
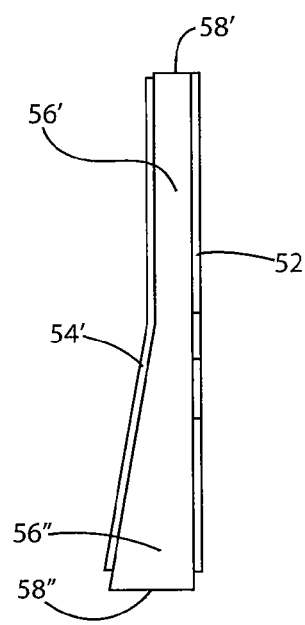
Figure 8A:
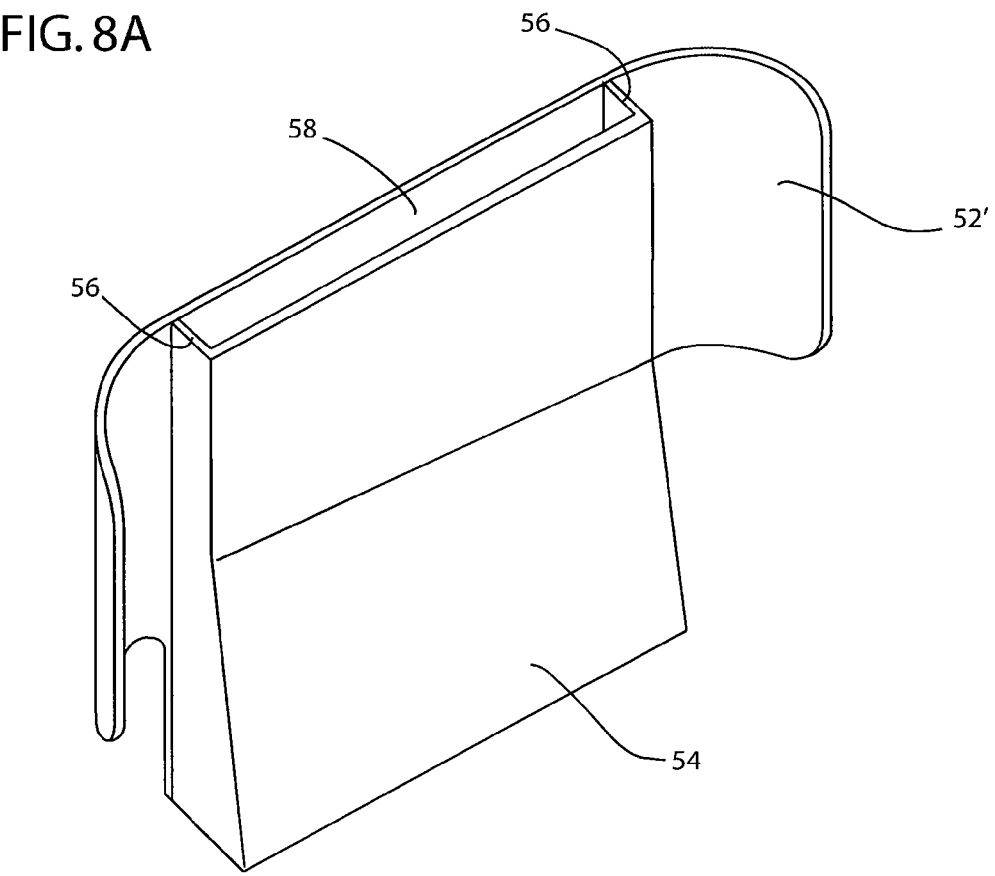
Figure 8B:
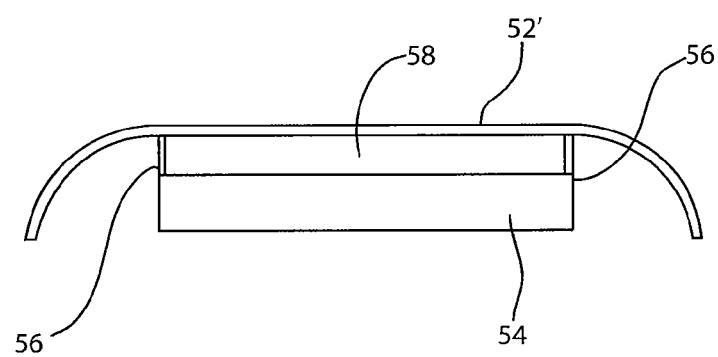

The side panels 56 can be, but typically are not, rectangular over their entire length. FIGS. 6E, 7E and 8D illustrate that while top of the side panels 56' is rectangular, a bottom of the side panels 56" can be in a triangular or trapezoidal shape. This allows the bottom of the gap 58" flair out toward the user, as opposed to the top of the gap 58'. Thus, the bottom of the gap 58" is wider than the top of the gap 58'. This allows the seat back 50 to adjust to the varying width of the seat back frame 14 which accounts for varying loads across the length of the seat back frame 14. Flaring the bottom of the gap 58" also leads to the front panel 54 to be partially angled outward to the user. This can be used to provide lumbar support to the user.

FIGS. 6A-6E illustrate an embodiment where the back panel 52 is wider than the front panel 54 at all points. In this embodiment, the back panel 52 is "T" shaped. FIGS. 7A-7E illustrate another embodiment where front panel 54' is similarly shaped to back panel 52. An additional space can be formed outside the gap 58, on opposite sides of the side panels 56. However, the seat back frame 14 is not received within the space. Illustrated in FIGS. 8A-8D, back panel 52' remains generally "T" shaped, and the top part of the "T" has two curved ends. The front panel 54 is the same or similar to the front panel illustrated in FIGS. 6A-6E. While three different embodiments of front and back panels 52, 52', 54, 54' are illustrated, one of ordinary skill in the art is aware that other shapes of the front and back panels are available and additionally, the upholster can form additional shapes based on the placement of padding and material using the above or other shapes as a base form.

As noted above, the seat back shell 50 allows for the upholstery process to be completed offline of the seat structure. This allows for the upholsterer to start the process absent of the seat structure to allow for more lead time. The same seat back shell 50 can accommodate different seat styles while using the same seat structure and allows for a lightweight approach to building up an upholstered seat back 22. Use of the seat back shell 50 significantly reduces upholstery time by providing a customizable base to be upholstered. A further benefit is that the entire seat back frame 14 does not have to be removed and this reduces adjustment necessary after reassembly.

Further, a typical embodiment is where the seat back shell 50 only encloses the seat back frame 14 and not the seat bottom frame 12. Since the seat back frame 14 can pivot in relation to the seat bottom frame 12, having a uniform shell for both the bottom and back can be difficult. Additionally, typically only a single seat back shell 50 is required to enclose the entire seat back frame 14. However, multiple seat back shells can be used, and stacked one on top of the other over the seat back frame 14 to build up the entire upholstered seat back 22. Each individual seat back shell 50 can have the same construction as the above embodiments.

Thus, while there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps which perform substantially the same function, in substantially the same way, to achieve the same results are within the scope of the invention. Substitutions of elements from one described embodiment to another are also fully intended and contemplated. It is also to be understood that the drawings are not necessarily drawn to scale, but that they are merely conceptual in nature. It is the intention, therefore, to be limited only as indicated by the scope of the claims appended hereto.

What is claimed is:

1. An aircraft seat comprising:
    a seat bottom frame having a back;
    a seat back frame pivotally connected to the back of the seat bottom frame; and
    a seat back shell comprising:
        a front panel;
        a back panel opposing the front panel;
        at least two side panels disposed between the front and back panels, connecting the front panel to the back panel;
        wherein the front, back, and side panels form a gap to receive the entire seat back frame.

2. The aircraft seat of claim 1, wherein the seat back shell consists of the front panel, the back panel, and two side panels.

3. The aircraft seat of claim 1, wherein a single gap is formed to receive the entire seat back.

4. The aircraft seat of claim 1, wherein the seat back shell only encloses the seat back frame.

5. The aircraft seat of claim 1, wherein the seat back frame comprises a flange to engage a top of the seat back shell to retain the seat back shell on the seat back frame.

6. The aircraft seat of claim 1, wherein a size of the front panel is different from the back panel.

7. The aircraft seat of claim 1, wherein a size of the front panel is the same as the back panel.

8. The aircraft seat of claim 1, wherein at least a portion of the side panels are formed in at least one of a triangular and a trapezoidal shape.

9. The aircraft seat of claim 1, wherein the seat back shell is upholstered separate from the aircraft seat.

10. The aircraft seat of claim 9, wherein the upholstered seat back shell is removably and replacably engaged to the seat back frame while the seat back frame remains connected to the seat bottom frame.

11. A seat back shell for an aircraft seat comprising:
    a front panel;
    a back panel opposing the front panel;
    at least two side panels disposed between the front and back panels, connecting the front panel to the back panel;
    wherein the front, back, and side panels form a gap to receive an entire seat back frame of the aircraft seat.

* * * * *